United States Patent
Feldman et al.

(10) Patent No.: US 11,809,384 B2
(45) Date of Patent: Nov. 7, 2023

(54) OPTIMIZED DATA STORAGE FOR FAST RETRIEVAL

(71) Applicant: MICROSOFT TECHNOLOGY LICENSING, LLC, Redmond, WA (US)

(72) Inventors: Michael Feldman, Pardesiya (IL); Nir Nice, Kfar Veradim (IL); Nimrod Ben Simhon, Netanya (IL); Ayelet Kroskin, Ra'Anana (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 448 days.

(21) Appl. No.: 15/450,782

(22) Filed: Mar. 6, 2017

(65) Prior Publication Data

US 2018/0253449 A1    Sep. 6, 2018

(51) Int. Cl.
*G06F 16/21*    (2019.01)

(52) U.S. Cl.
CPC .................................. *G06F 16/21* (2019.01)

(58) Field of Classification Search
None
See application file for complete search history.

(56) References Cited

U.S. PATENT DOCUMENTS

| | | | |
|---|---|---|---|
| 6,212,525 B1 | 4/2001 | Guha | |
| 6,907,422 B1 * | 6/2005 | Predovic | G06F 16/284 |
| 7,464,103 B2 * | 12/2008 | Siu | G06F 21/10 |
| 8,271,500 B2 | 9/2012 | Chellapilla et al. | |
| 3,397,051 A1 | 3/2013 | Beaman et al. | |
| 9,043,660 B2 | 5/2015 | Imamichi et al. | |
| 9,292,560 B2 | 3/2016 | Attaluri et al. | |
| 2006/0143170 A1 * | 6/2006 | Ganguly | G06F 16/24568 707/999.005 |
| 2009/0070354 A1 * | 3/2009 | Chellapilla | H04L 9/3236 |
| 2009/0271412 A1 * | 10/2009 | Lacapra | H04L 67/104 |
| 2011/0010396 A1 * | 1/2011 | Zhou | G06F 16/9024 707/798 |
| 2012/0102298 A1 | 4/2012 | Sengupta et al. | |

(Continued)

OTHER PUBLICATIONS

Naresh Kumar; Bucket Based Data Deduplication Technique for Big Data Storage System; 2016; IEEE; pp. 267-271 (Year: 2016).*

(Continued)

*Primary Examiner* — Albert M Phillips, III
*Assistant Examiner* — Jermaine A Mincey
(74) *Attorney, Agent, or Firm* — SHOOK, HARDY & BACON L.L.P.

(57) ABSTRACT

Systems and methods are provided for optimizing data storage and improving the speed of data retrieval in a data store, such as a storage server connected to a large network through the use of bucketing techniques to create efficient data structures for storing received key-value datasets at one or more storage servers. Fast key-value read requests and key-value retrievals may be accomplished through the use of multiphase lookup operations on the one or more storage servers. The system is optimized for best performance of retrieval through the separation of the write and read mechanisms. Systems and methods provided herein control the level of wastefulness on the back end of a system and reduce read operation inefficiencies on the front end of a system.

20 Claims, 5 Drawing Sheets

(56) References Cited

U.S. PATENT DOCUMENTS

| | | | |
|---|---|---|---|
| 2014/0025917 A1* | 1/2014 | Kaczmarczyk | G06F 11/1448 711/173 |
| 2015/0039626 A1* | 2/2015 | Sen | G06F 16/24556 707/747 |
| 2017/0010814 A1* | 1/2017 | Westlund | G06F 16/2255 |

OTHER PUBLICATIONS

Shoji Nishimura; MD-HBase: A Scalable Multi-dimensional Data Infrastructure for Location Aware Services; 2011; IEE; pp. 7-16 (Year: 2011).*

Biplob Debnath; SkimpyStash: RAM Space Skimpy Key-Value Store on Flash-based Storage; 2011; pp. 25-36 (Year: 2011).*

Istvan, et al., "A Flexible Hash Table Design For 10gbps Key-Value Stores on FPGAs", In Proceedings of 23rd International Conference on Field Programmable Logic and Applications, Sep. 2, 2013, 8 pages.

Lim, et al., "Silt: A Memory-Efficient, High-Performance Key-Value Store", In Proceedings of the Twenty-Third ACM Symposium on Operating Systems Principles, Oct. 23, 2011, pp. 1-13.

Azar, et al., "Balanced Allocations", In SIAM Journal on Computing, vol. 29, Issue 1, Feb. 2000, pp. 180-200.

Debnath, et al., "SkimpyStash: RAM Space Skimpy Key-Value Store on Flash-based Storage", In Proceedings of the ACM Sigmod International Conference on Management of data, Jun. 12, 2011, 12 pages.

Debnath, et al., "FlashStore: High Throughput Persistent KeyValue Store", In Proceedings of the VLDB Endowment, vol. 3, No. 1-2, Sep. 2010, pp. 1414-1425.

Lu, et al., "BloomStore: Bloom-Filter based Memory-efficient Key-Value Store for Indexing of Data Deduplication", In Proceedings of IEEE 28th Symposium on Mass Storage Systems and Technologies, Apr. 16, 2012, 12 pages.

Vilaca, et al., "A correlation-aware data placement strategy for key-value stores", In Proceedings of the 11th IFIP WG 6.1 international conference on Distributed applications and interoperable systems, Jun. 6, 2011, 14 pages.

Brandstatter, et al., "NoVoHT: A Lightweight Dynamic Persistent NoSQL Key/Value Store", In Proceedings of 2nd Greater Chicago Area System Research Workshop, May 3, 2013, 5 pages.

Escriva, et al., "HyperDex: A Distributed, Searchable Key-Value Store", In Proceedings of the ACM Sigcomm conference on Applications, technologies, architectures, and protocols for computer communication, Aug. 13, 2012, pp. 25-36.

* cited by examiner

OPTIMIZED DATA STORAGE FOR FAST RETRIEVAL

BACKGROUND

With business models shifting from stand-alone software to online environments, computer applications and services must adapt to storing large quantities of data on data servers, and utilizing that data across large networks. Particularly, online business front-end services can leverage data associated with a user as he or she conducts transactions over the Internet. However, there are inherent problems with storing very large amounts of data across many servers, such as a server farm. First, there is a lot of wasted space associated with data storage, such as wasted disk space, which leads to storage space inefficiency. Second, there is also system loss associated with reading the stored data when data storage is not optimized, such as loss realized through many disk seeks and long latency when a request is sent to find and look up data. As these inefficiencies are multiplied over a large number of storage servers, significant monetary loss and environmental concerns can also be realized.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein is directed towards systems and methods for key-value storage database optimization for fast value retrieval based on keys in a large dataset. In particular, aspects of the technology described herein take into consideration splitting the read and write operations to a storage server. In this way, large amounts of data may be written in bulk to a storage server and stored efficiently, thus minimizing space requirements and reducing memory costs. Fast value retrieval from the front end of a system can be enabled.

In one aspect, an optimized data structure for sorting key-value datasets is provided. In an offline mode, large sets of processed data are loaded onto a storage server. According to aspects of the technology described herein, those sets of data are turned into optimized data structures through the implementation of bucketing techniques. Accordingly, as will be further described, the systems and methods of the technology described herein efficiently divide key-value datasets into file-size-based buckets while minimizing total wasted disk space, thus controlling overall system waste. Each bucket includes multiple slots of the same size to store key-value pairs. The value does not need to fit the slot size exactly.

As will be further described, data storage consists of values of data indexed by keys that can be used to find and retrieve those values. Aspects of the technology described herein utilize multiphased or tiered read operations. In conjunction with the optimized data structure, read requests can be sent from front-end services or user devices, and maintain very fast and accurate data lookup and retrieval operations resulting in substantially reduced disk seeks and shortened read latency. In one aspect, only two hash operations and a single disk seek is required to retrieve data.

Additional objects, advantages, and novel features of the technology described herein will be set forth in part in the description which follows, and in part will become apparent to those skilled in the art upon examination of the following, or may be learned by practice of the technology described herein.

BRIEF DESCRIPTION OF THE DRAWINGS

Aspects of the technology described in the present application are described in detail below with reference to the attached drawing figures, wherein.

DETAILED DESCRIPTION

The technology of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, efficient storage of data and the fast retrieval of efficiently stored data. In aspects of the technology described herein, key-value storage databases can be designed and optimized specifically for extremely fast retrieval in online settings. Data storage can consist of values of data indexed by one or more keys that can be used for finding and extracting those values in a network, for example, in an online setting. In order to reduce or minimize system latency, for example, due to cache misses, and to reduce space requirements, data can be stored in continuous memory. In order to minimize response times in network services and improve the capacity of data centers, fast retrieval of the stored data is important. As such, where many data centers store large amounts of data, for example, in large distributed file-based caching systems, aspects of the present technology allow high-speed location and retrieval of data values. Thus, the technology simplifies the movement of data within the system while further allowing dynamic scalability of the overall system so that data does not have to be repartitioned, i.e., data servers may be added or removed without the need to move data. Accordingly, space requirements and memory costs may be reduced or minimized for the storage of data and the location and retrieval of the stored data can be maximized for efficiency and speed.

As used herein, the term "bucket" or "bucketing" refers to a technique for decomposing datasets and creating data structures within databases or servers to store information. Values within datasets can be hashed and then stored into buckets. Buckets can be fixed so they do not fluctuate with the data and data can be placed into distinct buckets as files. Hashing algorithms can be used to generate a range of buckets (e.g., 1 to N), each with different sized slots to accommodate data of a different size, and based on the results of the hashing, data is placed into particular buckets as a file.

The goal of the bucketing process is to find an optimal group of buckets for the particular dataset to be stored. The dataset can include values of different sizes. Each bucket is designed with a plurality of data slots to store values. Within a single bucket, each data slot is the same size. Not all values ultimately stored in a bucket need be exactly the size of the slot. Some values stored in a bucket may be smaller than the space allocated to the data slot in the bucket. The goal is to eliminate wasted space created by a mismatch between slot size and value size. In a situation where every file size matched a bucket size, no waste would be present. The method of selecting bucket size described below attempts to approach this ideal, while allowing for constraints, such as a maximum number of buckets and percentage of wasted space.

As an example, the bucketing process may be constrained by 1% space waste and 64 buckets. If a bucket arrangement is found with less than 64 different buckets, each with a single slot size, then the process stops. If a solution is not found, then either the 64 bucket limit or the 1% space waste constraint is relaxed and an optimized arrangement sought. The relaxed constraint can be incrementally increased until a solution is found.

Accordingly, at a high level, a key-value storage database for fast retrieval in a network environment can be implemented. The data storage consists of data values indexed by a key that is used for finding and extracting those data values. In one aspect, the storage database may enable simultaneous finding and retrieving of different data values within a margin of a few milliseconds. In the context of a distributed file caching system (DFCS), a typical DFCS file contains a collection of key-value pairs in addition to metadata associated with the file. Given a key, one goal of the system is to quickly retrieve the value associated with it. Read latency associated with value retrieval is impacted by the number of disk operations completed during the read process, for example, the seek time and latency associated with locating the correct track and sector during disk seek operations. As such, bucketing techniques are employed for storing a given dataset as a highly efficient or optimized stored data structure. Utilizing an efficient data structure, read operations to a data store, data server, or disk can also be optimized for speed and accuracy.

Aspects of the technology described herein take advantage of separate read/write functions. Given a large dataset to be stored, bulk write functions (e.g., bulk dataset uploads) can be performed on the back end of the system, thus allowing for the optimization of data structuring in a data store or data server. Key-value read functions can then be performed on the front end of the system. As such, the data stores do not have to be partitioned for both read and write. In some aspects, systems and methods of the technology described herein can be optimized for read-only operations.

Figure 1:
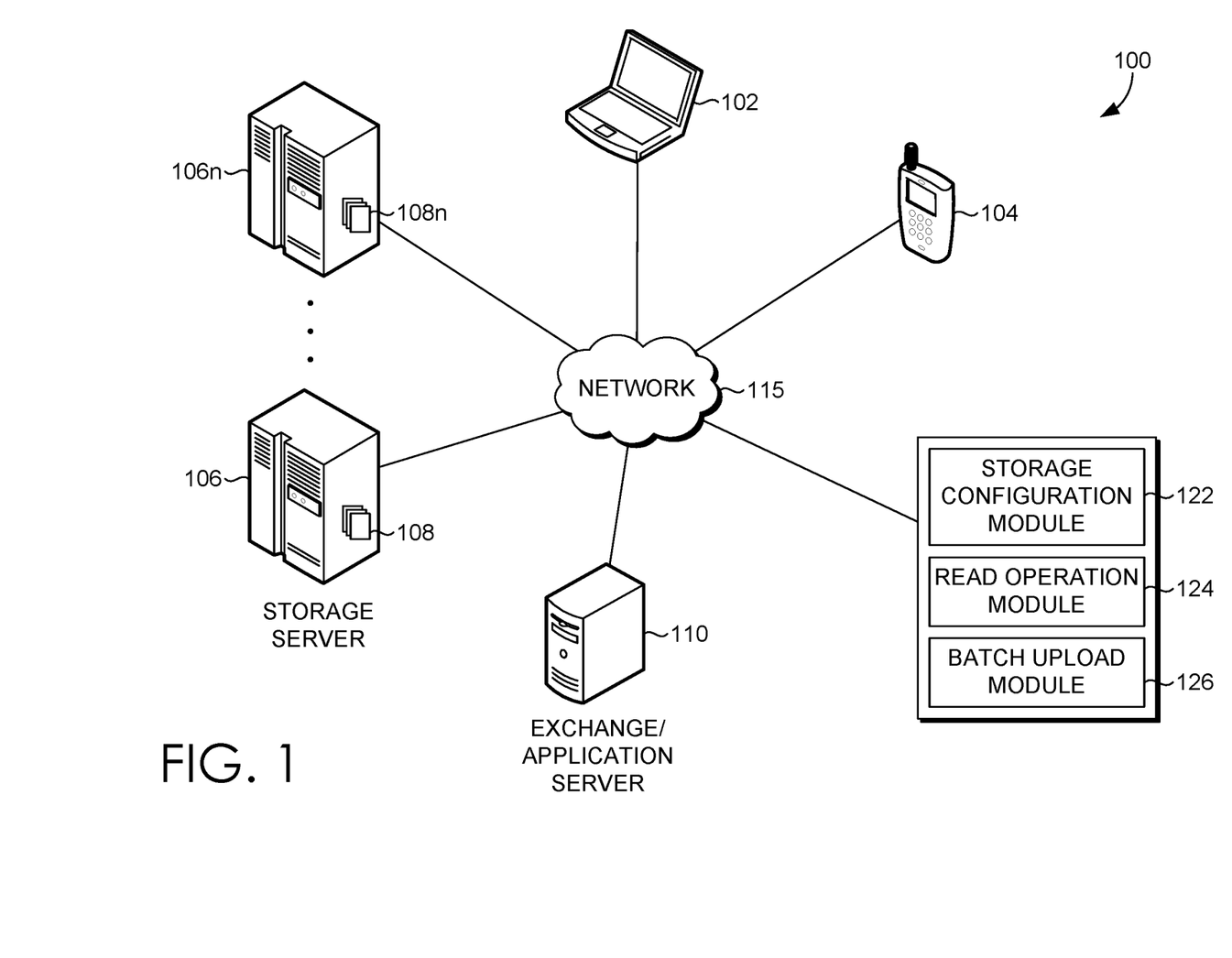
FIG. 1 is a block diagram of an example system architecture suitable for implementing aspects of the technology described herein.

Having briefly described an overview of aspects of the technology described herein, an example operating environment suitable for use in implementing the technology is now described. With reference to FIG. 1, a block diagram is provided showing aspects of an example system architecture suitable for implementing an aspect of the technology described herein and designated generally as system 100. It should be understood that this and other arrangements described herein are set forth only as examples. Thus, system 100 represents only one example of a suitable computing system architecture. Other arrangements and elements (e.g., user devices, data stores, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, system 100 includes network 115 communicatively coupled to one or more user devices (e.g., items 102 and 104), exchange/application server 110, storage 106, storage configuration module 122, read operation module 124, and batch upload module 126. The components shown in FIG. 1 may be implemented using one or more computing devices, such as computing device 500 described in connection to FIG. 5. Network 115 may include, without limitation, one or more local area networks (LANs) and/or wide area networks (WANs). Such networking environments are commonplace in offices, enterprise-wide computer networks, intranets, and the Internet. It should be understood that any number of user devices, storage components, and key-value system configuration models may be employed within the system 100 within the scope of the technology described herein. Each may comprise a single device or multiple devices cooperating in a distributed environment. For instance, storage configuration module 122, read operation module 124, or batch upload module 126 may be provided via multiple devices arranged in a distributed environment that collectively provide the functionality described herein. Additionally, other components not shown may also be included within the network environment.

Example system 100 includes user devices 102 and 104, which may comprise any type of user device capable of receiving input from a user. For example, in one aspect, user devices 102 and 104 may be the type of computing device described in relation to FIG. 5 herein. By way of example and not limitation, a user device may be embodied as a personal data assistant (PDA), a mobile device, a laptop, a tablet, remote control, entertainment system, vehicle computer system, embedded system controller, appliance, consumer electronic device, or other electronics device capable of receiving input from a user. The input may be received by one of many different modalities, such as, by way of example and not limitation, voice or sound, text, touch, click, gestures, the physical surroundings of the user, or other input technologies described in connection to FIG. 5. For instance, a user may utilize a search engine to input a query, intending to receive information highly relevant to the query. Or a user may use voice commands with a gaming system, television, etc. All of these forms of input, as well as others not specifically mentioned herein, are contemplated to be within the scope of the technology described herein. In some aspects, data input or data used by user devices 102 and 104 may be stored in storage 106.

Example user devices 102 and 104 are included in system 100 to provide an example environment wherein data stored by aspects of the technology described herein may be used by one or more user devices 102 and 104. It is also contemplated that some aspects of the technology described herein do not include user devices. For example, aspects of the technology may be practiced entirely on a server or in the data store. Further, although FIG. 1 shows two example user devices 102 and 104, a user may be associated with only one user device or more than two devices.

Storage server 106 may store data files containing a dataset (i.e., a collection of key-value pairs) along with metadata associated with those files. For example, files in a distributed file caching system may comprise key-value pairs, and, as such, given a key, values associated with that key may be retrieved. In an aspect, storage server 106 comprises a data store, computer data memory, database, or disk. Further, although depicted as a single data store component, storage server 106 may be embodied as one or more data stores or may be in the cloud. In some aspects, file data (or a dataset) is stored across a plurality of storage servers. In some aspects, storage server 106 is configured to store read-only data, e.g., as DFCS data files. A batch upload module 126 may be utilized to load data files onto one or more storage servers 106. Any amount of data may be collected either periodically or aperiodically to create a raw dataset which is then processed, and subsequently may be uploaded onto one or more storage servers 106. In some aspects, the data files to be uploaded contain only the changes to the dataset or metadata already stored on the storage servers.

Storage configuration module 122 may be used to create an optimized data structure for storing the datasets of the uploaded data files 108. As used herein, the creation of an optimized data structure for the storage of the data and dividing values of a dataset into buckets is also known as "bucketing." The bucketing process allows for the configuration of the storage structure to be created in an offline phase. According to aspects of the technology described herein, each bucket of the storage structure is defined to hold data of similar size, and as such records of similar size can be grouped together. In this way, the data structure can minimize or eliminate wastefulness, for example, by minimizing padding. It will be appreciated that the bucketing process essentially creates an array structure having 1 to m buckets identified by an index. According to aspects of the technology described herein, once a data structure is set, each bucket will contain a collection of key-value pairs, where each value within the bucket occupies a "value slot" of the same length. Assuming that max is the maximum length of a value within a bucket, the data file contains max bits for every value within the bucket, i.e., for values shorter than max, the values will be padded with 0 bits. Padding values creates some space waste but allows for very fast read requests. According to aspects of the technology described herein, it is desirable to minimize space waste for any given bucket. This can be represented by the following:

$$\text{total space waste} = \sum_{i=1}^{\# \text{ of buckets}} \text{space\_waste}(\text{bucket}_i) \quad (1)$$

where:

$$\text{space}_{waste(bucket)} = \sum_{value \in bucket} \max - \text{length}(value) \quad (2)$$

It will be appreciated that if all values in a bucket were the same length, there is a total waste factor=0. Accordingly, when dividing values into buckets, it is an object of aspects of the technology described herein to minimize the total space waste. The bucketing process carried out, for example, by storage configuration module 122, is an iterative greedy algorithm that coalesces a set of values having different value lengths into no more than m buckets with up to n % space waste. According to aspects of the technology described herein, variables m and n can be utilized as bucketing limits which can be set automatically by system 100 or can be set manually. In some aspects, both variables can be set, or alternatively, one variable can be set as a hard limit, causing the other variables to adjust accordingly. In accordance with aspects of the technology described herein, bucketing as described above optimizes the number of buckets and their size within a data file. In this way, allowed waste within the system can be controlled and minimized. The end result of the bucketing process is a group of buckets, each having value slots of a different size. The key-value pairs are then stored in the slots and metadata describing the slot is stored.

The read operation module 124 can be configured to perform a read operation on the stored data files 108. According to aspects of the technology described herein, given a key, the read operation module 124 can retrieve the value associated with it from the data structure. In order to perform a read operation for a given key, herein key, the system must be able to determine which bucket that key resides in. In order to accomplish a read operation according to aspects of the technology, metadata is stored along with a file 108 in a storage server 106. The stored metadata may include: a flat array of bucket numbers (e.g., index numbers) Buckets-_Array, and a hash function G that maps each key to the array (i.e., a function that can evaluate a key and determine in which bucket each key is found). The metadata may further include, for each bucket, a value slot length, a hash function for the keys in the bucket to evaluate a given key and translate it to a value slot index in the bucket (e.g., a minimum perfect hash or MPH), and the offset within the file where all the values in the bucket are stored (i.e., the specific location address). Given the foregoing metadata, the particular bucket where the key resides can be determined by:

$$\text{bucket number} = \text{Buckets}_{Array[G(key)]} \quad (3)$$

Utilizing the bucket number, the read offset for a value associated with the key can be calculated by:

$$\text{offset} = \text{bucket\_offset} + \text{MPH}_{selected\_bucket}(key) * \text{value}_{slot\_length} \quad (4)$$

The resulting data files stored in storage server 106 are consequently very compact and space efficient, and the resulting data structure can have a relatively small number of buckets to store key-value pairs (e.g., between 1 and 64 buckets). As a result, only a few bits per key are required for the bucket numbers flat array. The bucketing method implemented by the algorithm above with respect to storage configuration module 122 can achieve a very low space waste (e.g., between 0.1% and 1%). Greater space efficiency can also be achieved through the use of a minimum perfect hash algorithm. Furthermore, all the metadata is compact and can be stored or saved entirely in RAM. As such, when performing a read operation, two hashes can be applied followed by an in-memory cache assisted disk read to maximize single disk seeks, which results in a fast read latency.

It will be appreciated that any hash function may be used to create a key-value data structure incorporating the bucketing process and for performing read operations to the data structure to retrieve values. In some aspects of the technology described herein, a minimum perfect hash is used. Theoretically, assuming a collection of keys $K=\{k_1, k_2, \ldots, k_n\}$, a minimum perfect hash (MPH) is a function H from $K \to \{0, 1, \ldots, n-1\}$ with no collisions. Meaning that for $k_1 \neq k_2$, the result is $H(k_1) \neq H(k_2)$. Assuming all values associated with each key are of the same length, it would be possible to generate a single MPH function for all the keys. Given a key k, offsets for each value could be calculated by: offset=H(k)*Row_Size. Performing a disk read and seeking to this offset would then quickly return the requested value. However, according to aspects of the technology described herein, where data sizes differ from record to record in a dataset, the bucketing process described herein is implemented.

Figure 2:
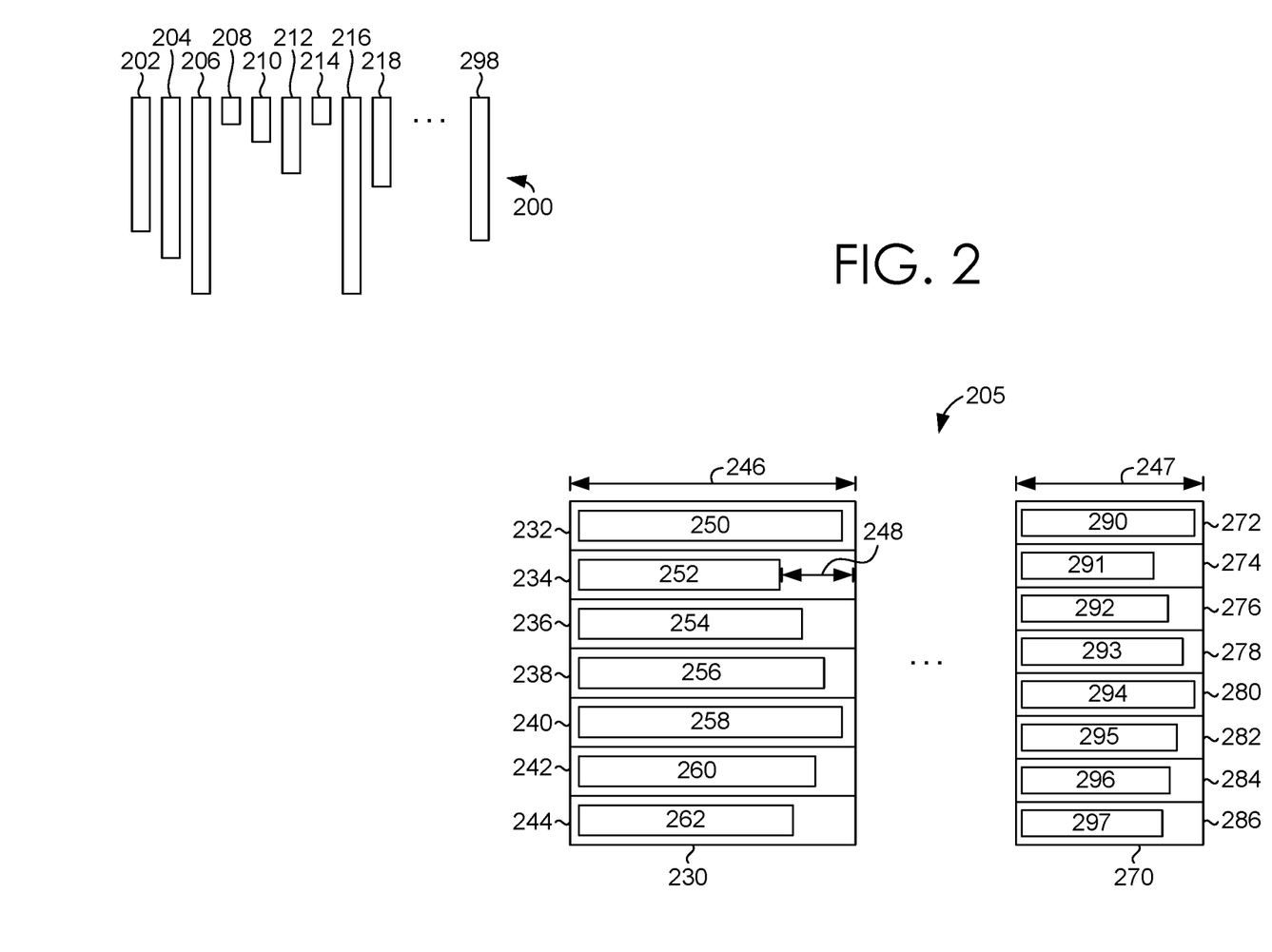
FIG. 2 is an exemplary system diagram showing a bucketed data storage system suitable for implementing aspects of the technology described herein.

Turning to FIG. 2, a visualization of the bucketing process is provided. Initially, a plurality 200 of data records 202, 204, 206, 208, 210, 212, 214, 216, 218, and 220 are received. For exemplary purposes, only a small number of data records are depicted. These data records need to be stored in buckets. As can be seen, the data records contain different amounts of data. The different amount of data in each record is depicted by the size of the data record shown. The goal is to define a group of buckets having slot sizes to store each data record in the plurality 200 while minimizing the wasted space.

Two buckets from a plurality of buckets 205 are shown. As with the data records, only two buckets are shown for the sake of simplicity. Each bucket includes data slots that hold data records. The first bucket 230 includes data slots 232, 234, 236, 238, 240, 242, and 244. The second bucket 270 includes data slots 272, 274, 276, 278, 280, 282, and 284. As can be seen, each slot in the first bucket 230 has a data capacity 246 depicted visually as a length of the slot. Each slot in the second bucket 270 has a data capacity 247. The data capacity 246 for slots in the first bucket 230 is greater than the data capacity 247 for slots in the second bucket 270. Accordingly, the data records stored in the second bucket 270 will be smaller than the data records stored in the first bucket 230.

Data record 250 is stored in slot 232. Data record 252 is stored in slot 234. The space 248 represents wasted space that is allocated to the slot 234 and not used by the data record 252. Data records 254, 256, 258, 260, and 262 are also stored within slots in the first bucket 230. Data records 290, 291, 292, 293, 294, 295, 296, 297 are stored within slots in the second bucket 270.

Figure 3:
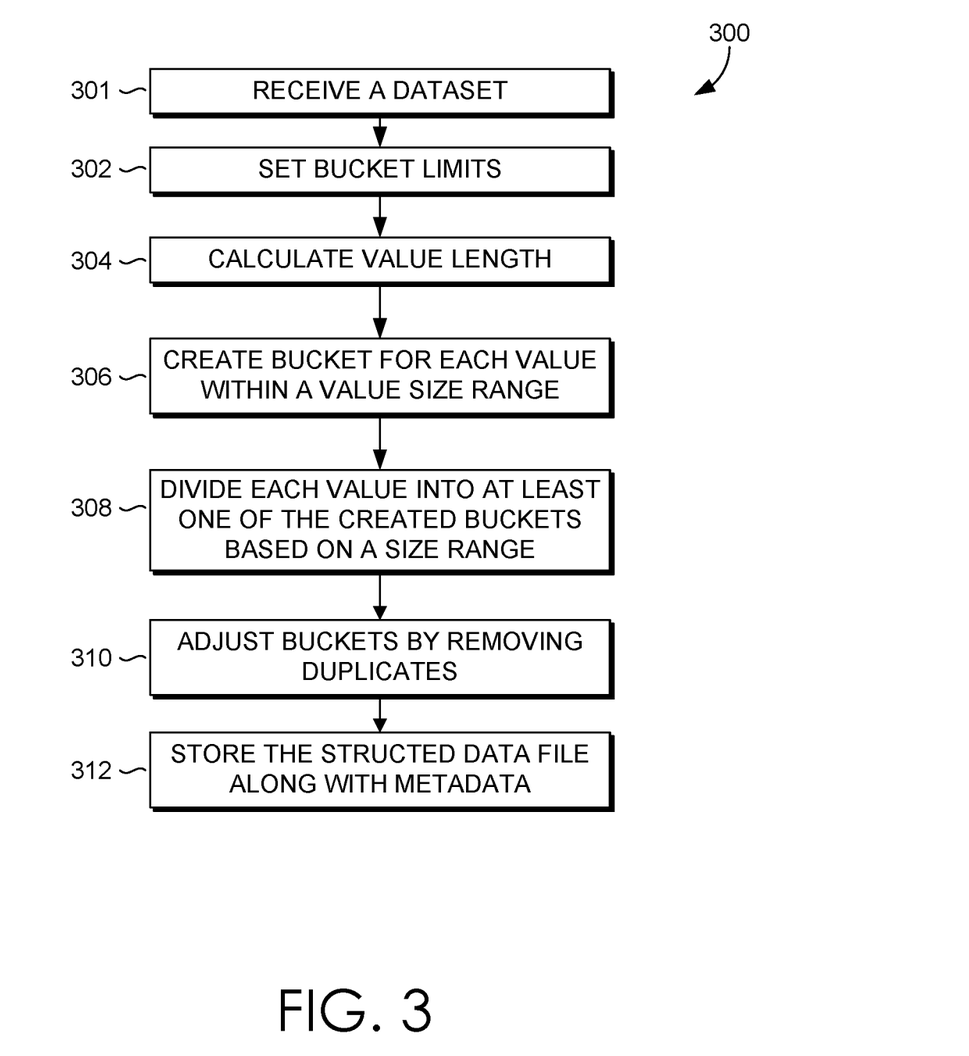
FIG. 3 depicts an exemplary flow diagram of a method for optimizing a data structure to store a dataset, in accordance with aspects of the present disclosure.

Turning to FIG. 3, a flow diagram is provided illustrating one exemplary method 300 for optimizing a data structure to store a dataset. The data structure produced according to method 300 is suitable for use in a storage system for fast value retrieval, for example, in an online environment.

The method 300 is initialized when a dataset is uploaded into one or more storage servers (e.g., 106 of FIG. 1). The method 300 of dividing values from the dataset into the data structure is the bucketing process. At step 301 a data file comprising a dataset is received. The dataset consists of a plurality of records having key-value pairs. At step 302, the bucketing limits are set, for example, at least one of m or n % space_waste according to formula (1) above. At step 304, the value length for each value of the dataset is calculated. At step 306, buckets are created for each value that contains all values with value sizes between [value_length−n/2, value_length+n/2]. At step 308 each value is divided into at least one of the created buckets based on a size range. Each value is bucketed using a hash function. At step 310, the buckets are adjusted. The bucket with the most values is selected, and the remaining buckets are adjusted by removing values already included in other buckets (i.e., removing duplicative values across the buckets). At step 310, the bucket adjustment (e.g., step 308) can be repeated until either all the values are contained within a bucket or one of the bucket limitations is exceeded (e.g., waste space, number of buckets, or values within a bucket). The bucketing process is completed when all the values are stored in a bucket and no limitation is exceeded. Alternatively, if either m or n % was set as a hard limitation, the other limitation may be relaxed and the process may continue. At step 312 the structured data file formed by the buckets is stored along with metadata describing the buckets and other aspects of the data file.

Figure 4:
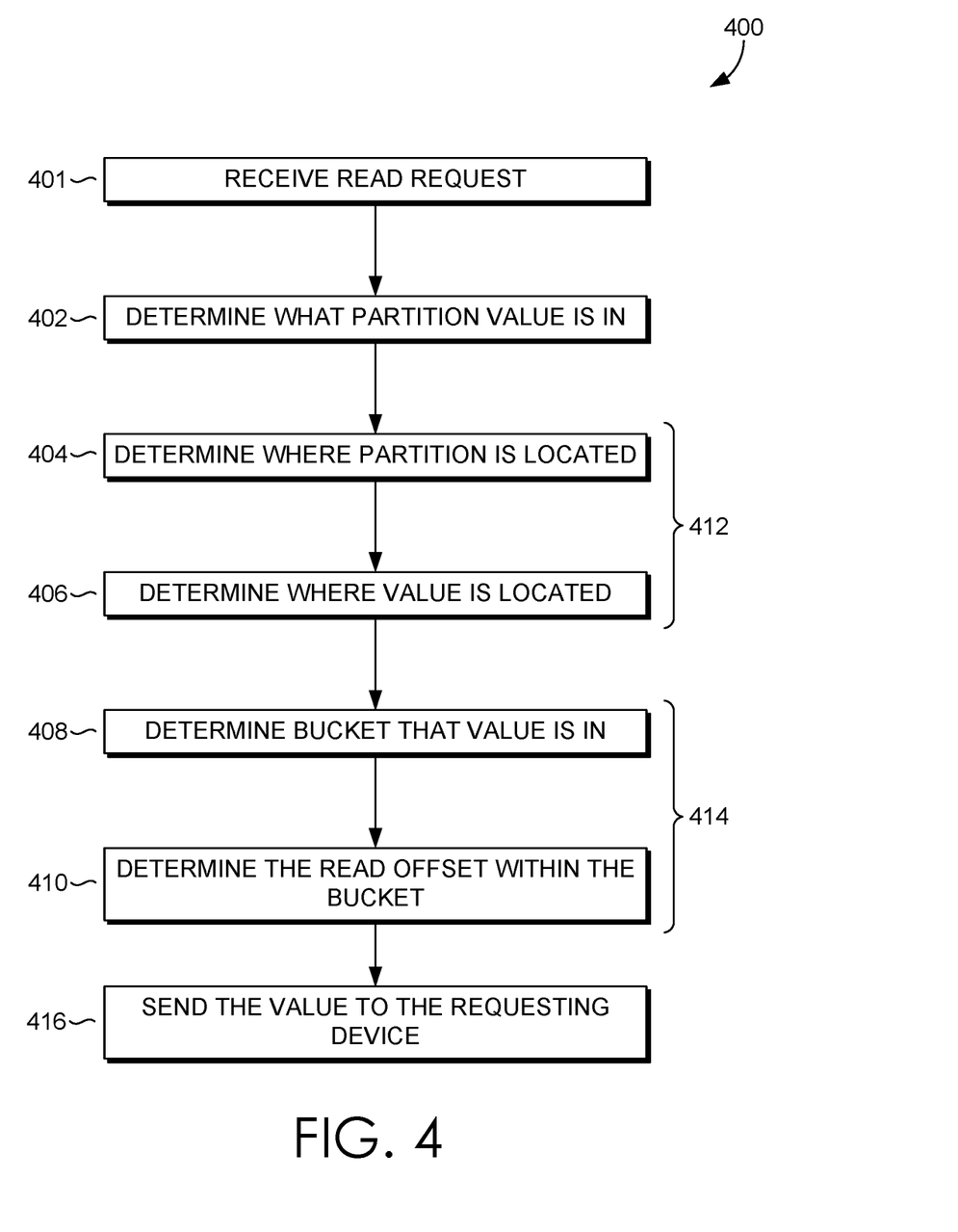
FIG. 4 depicts an exemplary flow diagram of a method for performing a read request to a storage server, in accordance with aspects of the present disclosure.

Turning to FIG. 4, a flow diagram is provided illustrating one exemplary method 400 for a read operation (i.e., value look up and retrieval) in accordance with implementations of the technology described herein. The data structure produced according to method 400 is suitable for performing read operations on a storage server in, for example, an online environment.

The method 400 is initialized at step 401 when a read request is made to and received by a storage server (e.g., 106 of FIG. 1). When a read request is made to a storage server, an accompanying key is provided to find and retrieve an associated value. At step 402, having a given key associated with a read request from a device (e.g., 102, 104 of FIG. 1), the server partition where the associated value is located is determined. The partition where the value can be located can be determined by taking the hash function used to create the partitions, evaluating the key as a function of the hash, and determining which partition the associated value resides. At step 404, once the partition housing the associated value is determined, the location of that partition is determined. The location of a partition across a plurality of data servers can be determined utilizing a global manifest record, which is a record of all data stored and where it is located. As such, starting at an initial server, the global manifest can be utilized to determine where the dataset containing the value is located based on what partition is generated by the hash function at step 402. It will be appreciated that the lookup process with respect to steps 402 and 404 can be carried out in memory. At step 406, once the dataset (e.g., file) is located on a storage server, the data being requested (e.g., value) is located. In an aspect according to the technology described herein, locating the data in the file can be regarded as a two-step lookup. At step 408 the bucket the data is in is determined. Using the key associated with the read request, and the hash function and array metadata associated with the file, the bucket number where the data is located within the file can be determined, for example, according to formula (3) above. At step 410, using the determined bucket number, the read offset (i.e., allocation within the bucket) where the data is located can be determined according to formula (4) above. According to an aspect of the technology described herein, the read operation can be viewed as a two-step process. At step 412, the location of the file amongst a plurality of data severs comprising a plurality of partitions is determined. At step 414, once the data file itself is located, the location of the data requested (i.e., value) within the file is located. At step 416, the value is sent to the requesting device.

Figure 5:
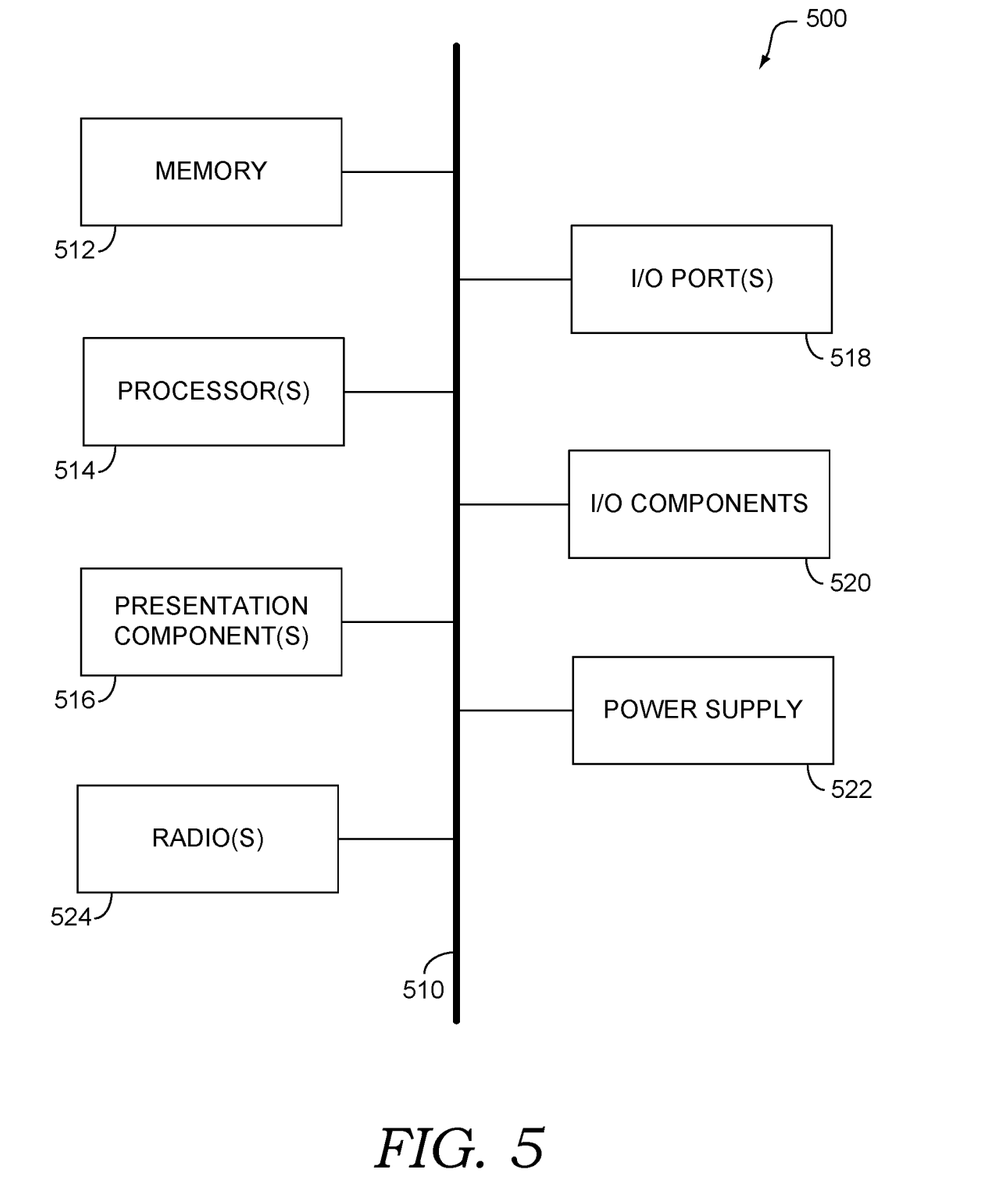
FIG. 5 is a block diagram of an exemplary computing environment suitable for implementing aspects of the technology described herein.

Having described various implementations, an exemplary computing environment suitable for implementing aspects of the disclosure is now described. With reference to FIG. 5, an exemplary computing device is provided and referred to generally as computing device 500. The computing device 500 is but one example of a suitable computing environment and is not intended to suggest any limitation as to the scope of use or functionality of aspects of the disclosure. Neither should the computing device 500 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including hand-held devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media.

Computer storage media includes both volatile and non-volatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. In some implementations, presentation components may be associated with user devices 102 and 104 of system 100 and may be embodied as a presentation component 516. Other examples of presentation components may include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some aspects of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

EXEMPLARY EMBODIMENTS

A method for creating an optimized data structure, the method comprising: receiving a data file comprising a dataset, wherein the dataset consists of a plurality of records having key-value pairs; setting at least one bucketing limit, wherein bucketing limits control a resulting data structure; calculating a value length for each value in the dataset; creating a bucket for each value size; dividing each value into at least one of the created buckets based on a size range, wherein each value is bucketed using a hash function; adjusting each bucket by removing duplicative values across all buckets to create a structured data file; and storing the structured data file along with metadata.

Embodiment 2. The method of embodiment 1, wherein the at least one bucketing limit comprises a number of buckets or a percentage of space waste.

Embodiment 3. The method of embodiment 2, wherein a first bucketing limit is set as a hard limit, causing another limit to automatically adjust.

Embodiment 4. The method of any of one of the preceding embodiments, wherein the hash function is a minimum perfect hash.

Embodiment 5. The method of any of one of the preceding embodiments, wherein each value in a bucket is within a range of [value length−n/2, value length+n/2], wherein n is a percentage of space waste.

Embodiment 6. The method of any of one of the preceding embodiments, wherein the metadata comprises at least one of: a flat array of bucket numbers, a hash function that maps each key to a flat array, a value slot length for each bucket, a hash function mapping each key to a value slot index in the bucket, or an offset of the value within the bucket.

Embodiment 7. The method of any of one of the preceding embodiments, further comprising repeating the adjusting until at least one of: all values are in a bucket or a first bucketing limit is exceeded.

Embodiment 8. The method of any of one of the preceding embodiments, wherein values shorter than a possible maximum length of a value in a bucket are padded.

Embodiment 9. The method of any of one of the preceding embodiments, wherein space waste for a bucket is a summation, over all values within the bucket, of a difference between a possible maximum length of a value and an actual length of a value.

Embodiment 10. One or more computer-storage media having computer-executable instructions embodied thereon that, when executed by a computing system, cause the computing system to perform a method for performing a read operation with a single disk read, the method comprising: receiving a read request, from a requesting device, for a data value stored in a structured data file, the structured data file located on at least one of a plurality of storage servers in a storage server partition, wherein the read request is associated with at least one key; determining, by a first hash function, a bucket number of the structured data file, the bucket number indicating a bucket where the value is located; determining a location of the value in the bucket of the structured data file using a second hash function; performing a disk seek operation using the location to retrieve the value; and sending, in response to the read request, the value to the requesting device.

Embodiment 11. The media of embodiment 10, wherein the structured data includes metadata, the metadata comprising at least one of: a flat array of bucket numbers; the first hash function mapping each key to the flat array; a value slot length for each bucket; the second hash function mapping each key to a value slot index in a bucket; or a bucket offset.

Embodiment 12. The media of embodiment 11, wherein the bucket number is determined by evaluating the key, by the first hash function, and mapping the key to the flat array.

Embodiment 13. The media of embodiment 11, wherein the location of the value in the bucket of the structured data file is determined by: evaluating the key, by the second hash function, mapping the key to a value slot index in the bucket; multiplying the value slot index by the value slot length; and adding the bucket offset.

Embodiment 14. The media of embodiment 10, wherein the disk seek is the only disk seek operation performed while retrieving the value.

Embodiment 15. One or more computer-storage media having computer-executable instructions embodied thereon that, when executed by a computing device, cause the computing device to perform a method for performing a read operation, the method comprising: receiving a read request, from a requesting device, for a data value stored in a structured data file, the structured data file located on at least one of a plurality of storage servers in a storage server partition, wherein the read request is associated with at least one key; determining, by a first hash function operating on the key, the storage server partition in which the structured data file containing the value associated with the key resides; determining a location of the storage server partition from amongst the plurality of storage servers; determining a location of the value associated with the key, the determining the location comprising: determining, by a second hash function, a bucket number of the structured data file, the bucket number indicating a bucket where the value is located; and determining the location of the value in the bucket of the structured data file; and sending, in response to the read request, the value to the requesting device.

Embodiment 16. The media of embodiment 15, wherein the structured data includes metadata, the metadata comprising at least one of: a flat array of bucket numbers; the first hash function mapping each key to the flat array; a value slot length for each bucket; the second hash function mapping each key to a value slot index in the bucket; or a bucket offset.

Embodiment 17. The embodiment of claim 16, wherein the bucket number is determined by evaluating the key, by the first hash function, and mapping the key to the flat array.

Embodiment 18. The media of embodiment 16, wherein the location of the value in the bucket of the structured data file is determined by: evaluating the key, by the second hash function, mapping the key to a value slot index in the bucket; multiplying the value slot index by the value slot length; and adding the bucket offset.

Embodiment 19. The media of any of one of embodiment 15, 16, 17, or 18, wherein the hash function is a minimum perfect hash.

Embodiment 20. The media of any of one of embodiment 15, 16, 17, 18, or 19, wherein determining the location of the storage server partition comprises utilizing a global manifest.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for creating an optimized data structure, the computer-implemented method comprising:
    receiving a data file comprising a dataset, wherein the dataset consists of a plurality of records having key-value pairs;
    setting at least one bucketing limit, wherein bucketing limits control a resulting data structure;
    calculating a value size for each value in the dataset;
    creating buckets based at least in part on the value size and the bucketing limit, wherein the buckets comprise a plurality of slots, wherein each slot in a single bucket is equal in size, and wherein different buckets comprise slots of different sizes;
    dividing each value into at least one of the created buckets based on a size range, wherein each value is bucketed using a hash function;
    adjusting each bucket by removing duplicative values across all buckets to create a structured data file based at least in part on the bucketing limit; and
    storing the structured data file along with metadata.

2. The computer-implemented method of claim 1, wherein the at least one bucketing limit comprises a number of buckets or a percentage of space waste, wherein the space waste is indicative of a mismatch between slot size and the value size, wherein the slot size corresponds to the plurality of slots within the bucket, each slot of the plurality of slots holds a particular value based on the slot size.

3. The computer-implemented method of claim 2, wherein a first bucketing limit is set as a hard limit, causing another limit to automatically adjust.

4. The computer-implemented method of claim 1, wherein the hash function is a minimum perfect hash.

5. The computer-implemented method of claim 1, wherein each value in a bucket is within a range of [value length−n/2, value length+n/2], wherein n is a percentage of space waste.

6. The computer-implemented method of claim 1, wherein the metadata comprises at least one of: a flat array of bucket numbers, a hash function that maps each key to a flat array, a value slot length for each bucket, a hash function mapping each key to a value slot index in the bucket, or an offset of the value within the bucket.

7. The computer-implemented method of claim 1, further comprising repeating the adjusting until at least one of: all values are in a bucket or a first bucketing limit is exceeded.

8. The computer-implemented method of claim 1, wherein values shorter than a possible maximum length of a value in a bucket are padded.

9. The computer-implemented method of claim 1, wherein space waste for a bucket is a summation, over all values within the bucket, of a difference between a possible maximum length of a value and an actual length of a value.

10. One or more non-transitory, computer-storage media having computer-executable instructions embodied thereon that, when executed by a computing system, cause the computing system to perform a method for performing a read operation with a single disk read, the method comprising:
    receiving a read request, from a requesting device, for a data value stored in a structured data file, the structured data file located on at least one of a plurality of storage servers in a storage server partition, wherein the read request is associated with at least one key;
    in response to the receiving of the read request for the data value stored in the structured data file and using the at least one key as an index, determining, by a first hash function, a bucket number of the structured data file, the bucket number being an identity of a bucket where the value is located, the value being a part of a key-value pair of the at least one key;
    using the bucket number as an input to a second hash function, determining a specific location of the value in the bucket of the structured data file;
    performing a disk seek operation using the location to retrieve the value; and
    sending, in response to the read request, the value to the requesting device.

11. The one or more non-transitory, computer-storage media of claim 10, wherein the structured data includes metadata, the metadata comprising at least one of: a flat array of bucket numbers; the first hash function mapping each key to the flat array; a value slot length for each bucket; the second hash function mapping each key to a value slot index in a bucket; or a bucket offset.

12. The one or more non-transitory, computer-storage media of claim 11, wherein the bucket number is determined by evaluating the key, by the first hash function, and mapping the key to the flat array.

13. The one or more non-transitory, computer-storage media of claim 11, wherein the location of the value in the bucket of the structured data file is determined by:
    evaluating the key, by the second hash function, mapping the key to a value slot index in the bucket;
    multiplying the value slot index by the value slot length; and
    adding the bucket offset.

14. The one or more non-transitory, computer-storage media of claim 10, wherein the disk seek is the only disk seek operation performed while retrieving the value.

15. One or more non-transitory, computer-storage media having computer-executable instructions embodied thereon that, when executed by a computing device, cause the computing device to perform a method for performing a read operation, the method comprising:

receiving a read request, from a requesting device, for a data value stored in a structured data file, the structured data file located on at least one of a plurality of storage servers in a storage server partition, wherein the read request is associated with at least one key;

determining, by a first hash function operating on the key, the storage server partition in which the structured data file containing the value associated with the key resides;

determining a location of the storage server partition from amongst the plurality of storage servers;

determining a location of the value associated with the key, the determining the location comprising:

(1) determining, by a second hash function, a bucket number of the structured data file, the bucket number indicating a bucket where the value is located; and (2) determining the location of the value in the bucket of the structured data file; and sending, in response to the read request, the value to the requesting device.

16. The non-transitory, computer-storage media of claim 15, wherein the structured data includes metadata, the metadata comprising at least one of: a flat array of bucket numbers; the first hash function mapping each key to the flat array; a value slot length for each bucket; the second hash function mapping each key to a value slot index in the bucket; or a bucket offset.

17. The non-transitory, computer-storage media of claim 16, wherein the bucket number is determined by evaluating the key, by the first hash function, and mapping the key to the flat array.

18. The non-transitory, computer-storage media of claim 16, wherein the location of the value in the bucket of the structured data file is determined by:

evaluating the key, by the second hash function, mapping the key to a value slot index in the bucket;

multiplying the value slot index by the value slot length; and adding the bucket offset.

19. The non-transitory, computer-storage media of claim 15, wherein the hash function is a minimum perfect hash.

20. The non-transitory, computer-storage media of claim 15, wherein determining the location of the storage server partition comprises utilizing a global manifest.

* * * * *